United States Patent [19]

Nagata

[11] Patent Number: 5,282,026
[45] Date of Patent: Jan. 25, 1994

[54] DEVICE FOR JUDGING THE TYPE OF COLOR OF A DOCUMENT

[75] Inventor: Katsumi Nagata, Sakai, Japan

[73] Assignee: Mita Industrial Co., Ltd., Japan

[21] Appl. No.: 848,180

[22] Filed: Mar. 10, 1992

[30] Foreign Application Priority Data

Mar. 12, 1991 [JP] Japan .................... 3-046497

[51] Int. Cl.$^5$ ............................. G03G 15/01
[52] U.S. Cl. ................... 358/500; 345/152
[58] Field of Search ............. 358/75–80, 358/261.1–261.2, 432–433; 395/131; 340/703, 703 A, 703 B, 703 C1–703 C3, 703 D1–703 D3

[56] References Cited

U.S. PATENT DOCUMENTS

| 4,149,152 | 4/1979 | Russo | 340/703 D1 |
| 4,206,457 | 6/1980 | Weisbecker et al. | 340/744 |
| 4,839,738 | 6/1989 | Kaku et al. | 358/261.2 |

FOREIGN PATENT DOCUMENTS 411918 2/1991 European Pat. Off. .

OTHER PUBLICATIONS

Patent Abstracts of Japan, vol. 10, No. 370 (E-463) Dec. 10, 1986 & JP-A-61 166 273 (Matsushita Electric Ind. Co. Ltd.) Jul. 26, 1986.
Patent Abstracts of Japan, vol. 14, No. 31 (P-993) Jan. 22, 1990 & JP-A-1 269 957 (Cannon Inc.) Oct. 27, 1989.
Patent Abstracts of Japan, vol. 12, No. 339 (P-757) Sep. 12, 1988 & JP-A-63 098 671 (Ricoh Co. Ltd.) Apr. 30, 1988.

*Primary Examiner*—Bentsu Ro
*Attorney, Agent, or Firm*—Beveridge, DeGrandi, Weilacher & Young

[57] ABSTRACT

A device for judging the type of color of a document judges in real time on the basis of read data whether or not a document is a color document or a black-and-white document. It is judged whether or not each pixel is a color pixel on the basis of the read data. When not less than a predetermined number of color pixels are continuously detected, the presence of a color block is detected. When there are not less than a predetermined number of color blocks in one line or there is a relatively long color block having not less than a constant length in one line, it is judged that the line is a color line. When not less than a predetermined number of color lines, for example, 100 color lines are detected, it is judged that the document is a color document.

22 Claims, 10 Drawing Sheets

DEVICE FOR JUDGING THE TYPE OF COLOR OF A DOCUMENT

BACKGROUND OF THE INVENTION

1. Field of the Invention

The present invention relates generally to a device for judging the type of color of a document which can be utilized for, for example, a digital color copying machine and a printer capable for multicolor printing, and more particularly, to a device for judging the type of color of a document for judging whether a document is a color document containing chromatic color information or a black-and-white document containing only achromatic color information.

2. Description of the Prior Art

Some digital color copying machines being commercially available have a mechanism for judging the type of color of a document for prescanning the document to read its image data and automatically judging from the image data read whether the document is a black-and-white document containing only achromatic color information or a color document containing chromatic color information.

In the mechanism for judging the type of color of a document in such a digital color copying machine being commercially available, the image data read is stored once in an image memory, the composition ratio of yellow (hereinafter referred to as "Y"), magenta (hereinafter referred to as "M") and cyan (hereinafter referred to as "C") colors constituting the data stored is investigated for each pixel, and the type of color of the document is judged on the basis of the results of the investigation.

When it is judged that the document is a black-and-white document containing only achromatic color information, copies are made using black (hereinafter referred to as "Bk") toner particles. On the other hand, when it is judged that the document is a color document containing chromatic color information, color copies are made using toner particles in three colors, that is, Y, M and C colors or toner particles in four colors, that is, Y, M, C and Bk colors.

The above described mechanism for judging the type of color of a document has the disadvantages in that a highcost image memory is an indispensable constituent element because the image data read must be stored once in the image memory so as to judge the type of color of the document, and the type of color of the document cannot be judged in real time on the basis of the image data read because the image data is stored once in the image memory.

SUMMARY OF THE INVENTION

The present invention has been made so as to solve the disadvantages of such a conventional mechanism and has for its object to provide a device for judging the type of color, capable of judging the type of color of a document in real time without using any image memory and on the basis of document data read.

The present invention provides a device for judging the type of color of a document, for judging whether a document is a color document containing chromatic color information or a black-and-white document containing only achromatic color information on the basis of document data read.

The document data read are sequentially applied to a color pixel detecting portion for each pixel. In the color pixel detecting portion, it is judged whether a pixel is a color pixel having a chromatic color on the basis of pixel data applied, to output a detection signal when the pixel is a color pixel. The presence of a color block is detected on the basis of the fact that the color pixel detecting portion continuously outputs not less than a predetermined number of (for example, four) detection signals.

When the presence of not less than a predetermined number of (for example, 100) color blocks is detected in one line, it is judged that the line is a color line.

Furthermore, when there are not less than a predetermined number of (for example, 100) color lines, it is judged that the document is a color document, to output a color document detection signal.

The above described respective reference numbers for detection can be freely determined.

According to the present invention, the document data applied need not be stored once in an image memory, and the document data applied is directly processed, thereby to make it possible to judge in real time whether the document is a color document or a black-and-white document. More specifically, it is possible to rapidly judge the type of color of the document in a simple circuit structure using no image memory.

Additionally, the reference numbers required for judging a color pixel, a color block, a color line and the like can be respectively set to arbitrary numbers. Accordingly, the boundary line as to what document is judged to be a color document and what document is judged to be a black-and-white document can be freely set and changed. For example, the boundary line can be freely set as to whether a black-and-white document containing chromatic color data in its part or a black-and-white document on which "strict secrecy" is written in cinnabar is judged to be a color document or a black-and-white document, thereby to make it possible to judge the type of color of a document for various applications.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A device for judging the type of color of a document which can be applied to a digital color copying machine will be described in detail by way of example.

Figure 1:
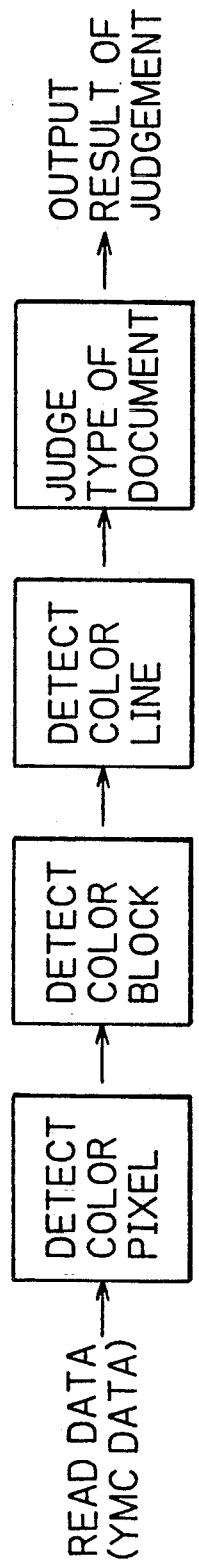
FIG. 1 is a diagram for explaining the processing in one embodiment of the present invention.

FIG. 1 is a diagram showing in outline, the processing in a device for judging the type of color of a document according to one embodiment of the present invention. In the present embodiment, document data read are sequentially applied for each pixel, and it is judged whether the pixel is a color pixel or a black-and-white pixel on the basis of data applied for each pixel, that is, pixel data.

Figure 2:
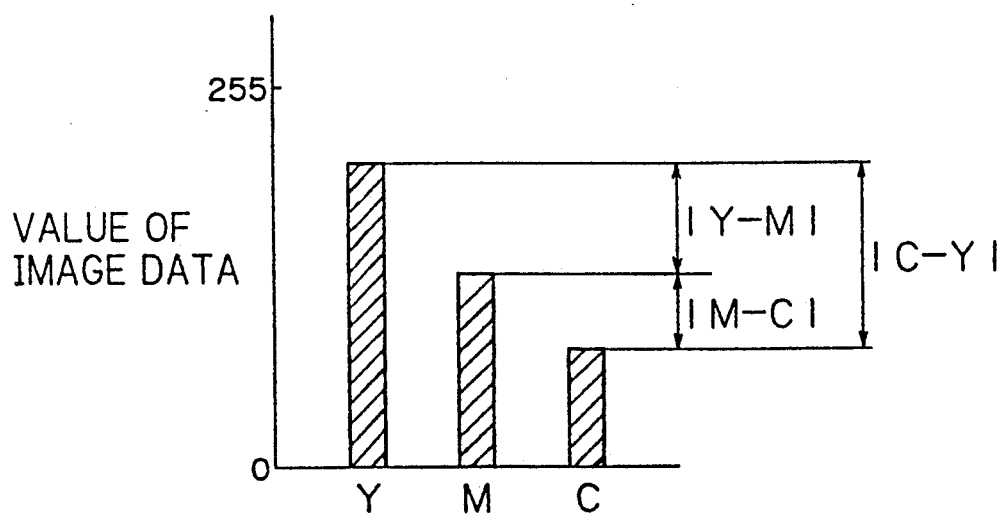
FIG. 2 is a diagram for explaining the method of detecting a color pixel.

The judgment whether the pixel is a color pixel or a black-and-white pixel is made by adopting an approach of calculating the absolute values of the differences between a yellow (Y) signal, a magenta (M) signal and a cyan (C) signal constituting the pixel data, as shown in FIG. 2, to consider the pixel as a black-and-white pixel when the values of the respective color signals are almost the same on the basis of the absolute values, that is, when $$|Y-M|=|M-C|=|C-Y|=0,$$

while considering the pixel as a color pixel when any one of the color signals differs in magnitude from the other color signals. The details of this approach will be described later.

An approach is adopted of detecting the presence of a color block as shown in FIG. 1 when color pixels whose number is not less than its reference number are continuously detected, judging when color blocks whose number is not less than its reference number are detected in one line that the line is a color line, and further judging that a document is a color document when color lines whose number is not less than its reference number are detected.

More conceptually, an approach is adopted of judging whether each pixel is a color pixel or a black-and-white pixel, and judging that a document is a color document when the frequency of occurrence and the number of times of occurrence of the pixel judged to be the color pixel are larger than some extent.

Figure 3:
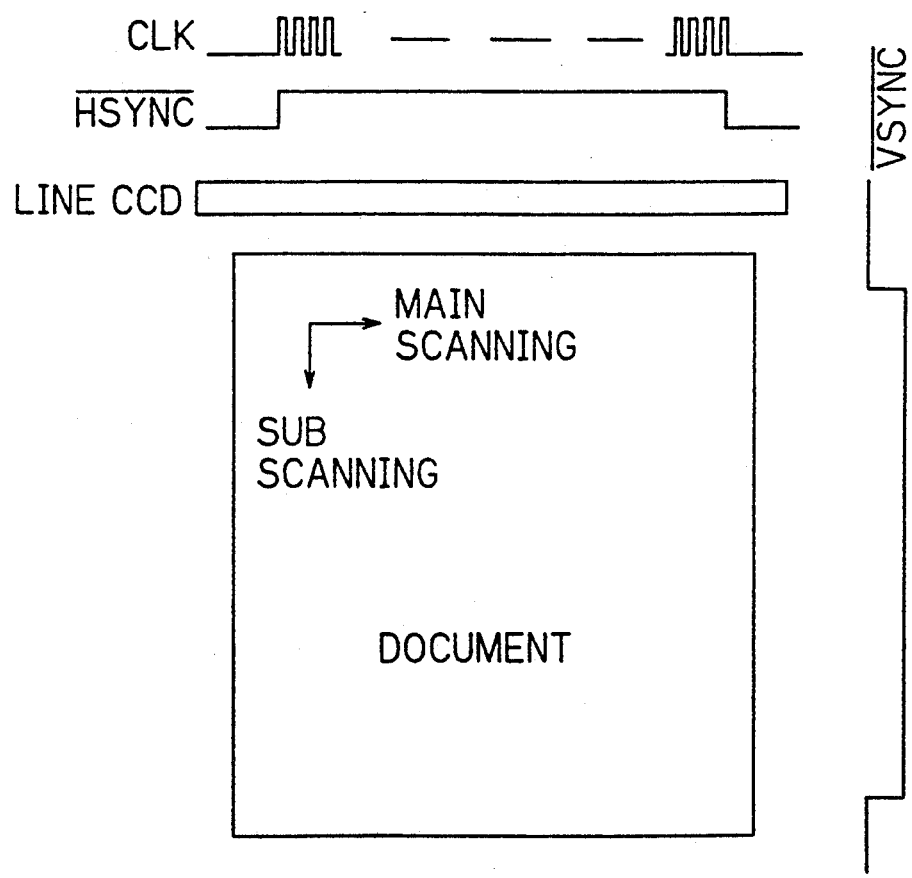
FIG. 3 is a conceptual diagram showing the relationship among a document, a line CCD, a clock CLK, a reversed Hsync signal indicating an effective period on one line of main scanning, and a reversed Vsync signal indicating an effective period in the direction of sub-scanning in one embodiment of the present invention.

FIG. 3 is a conceptual diagram for explaining a clock (CLK) in a case where a document is read by a line CCD. for example, provided in a digital color copying machine, the level of a signal indicating an effective period on one line of main scanning (a reversed Hsync signal), and the level of a signal indicating an effective period in the direction of subscanning (a reversed Vsync signal). The document is read for each line by self-scanning of the line CCD in the direction of main scanning, and the relative positional relationship between the line CCD and the document is sequentially displaced in the direction of subscanning so that the document is sequentially read for each line from its upper end side to its lower end side.

In FIG. 3, a region where the reversed Hsync signal and the reversed Vsync signal are both at a high level is an effective reading region of the document read by the line CCD. The type of color of the document is judged on the basis of read data read in this effective reading region whose size is smaller than the actual size of the document. The reason why the size of the effective reading region of the document is thus made smaller than the actual size of the document is that the number of occurrences of erroneous judgment can be reduced if the type of color of the document is judged on the basis of the main part of the document. If the periods during which the reversed Hsync signal and the reversed Vsync signal are respectively at a high level, are changed, the effective reading region can be set to an arbitrary region.

Figure 4:
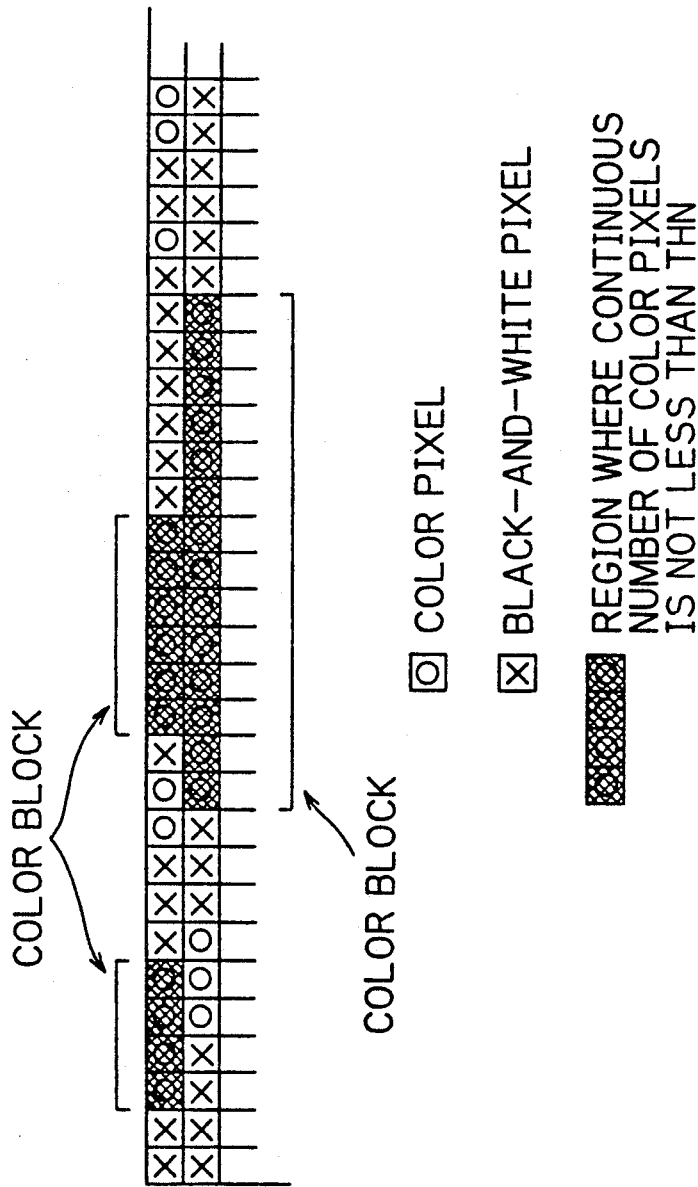
FIG. 4 is an illustration for explaining the method of judging a color block.
Figure 5:
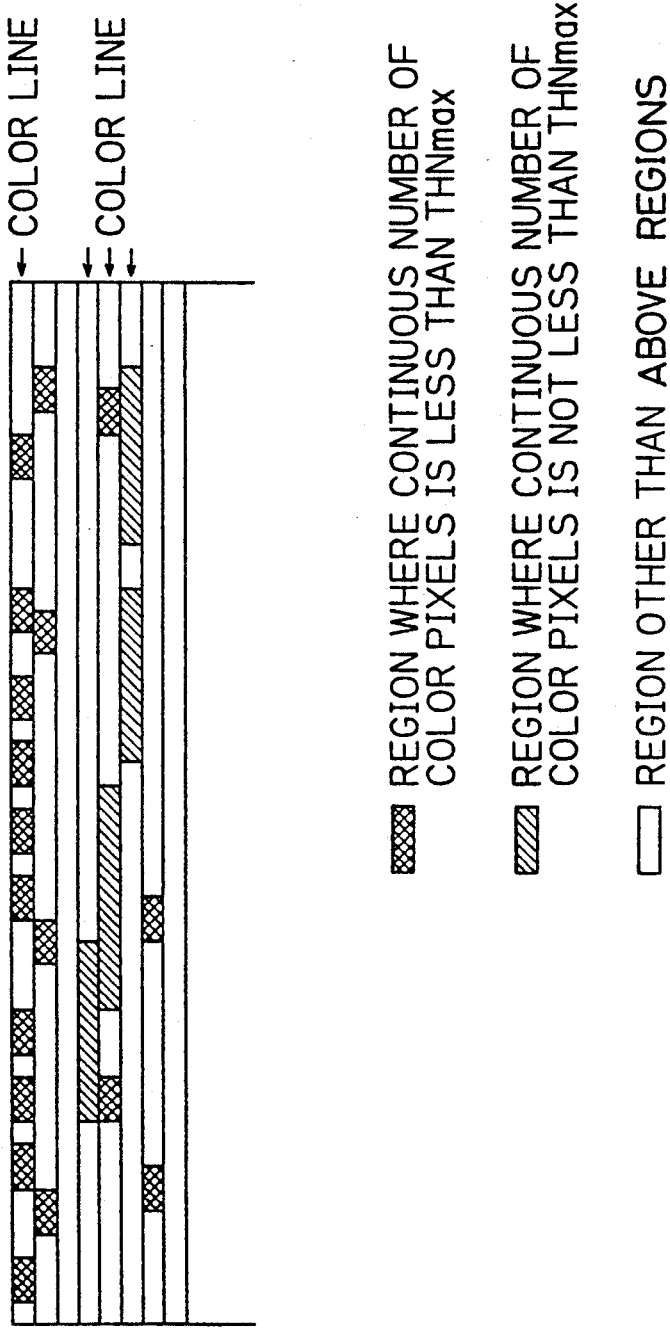
FIG. 5 is an illustration for explaining the method of judging a color line.

FIG. 4 is a diagram for explaining the method of detecting a color block explained in FIG. 1, and FIG. 5 is a diagram for explaining the method of detecting a color line explained in FIG. 1.

As shown in FIG. 4, it is judged whether a pixel is a color pixel (marked with "○") and a black-and-white pixel (marked with "x") on the basis of pixel data. A reference number for forming a color block THN is previously set to, for example, four. When not less than four color pixels continuously occur, the continuous color pixels are judged to be a color block. In FIG. 4, a portion in which fine dots are entered is a portion judged to be a color block.

Furthermore, when color blocks whose number is not less than a predetermined number of color blocks for forming a color line THM (for example, THM is set to 5 in FIG. 5) exist in one line, as illustrated in the first line (line in the upper end) in FIG. 5, it is judged that the line is a color line. Furthermore, when the length of a color block occurring in one line is not less than a predetermined length, that is, when there exists a color block constituted by continuous color pixels whose number is not less than a predetermined number of pixels for forming a color line THNmax (for example, THNmax=80), as illustrated in the fourth to sixth lines, it is judged that the line is a color line.

Meanwhile, in the actual device, THM is set to 100 by way of example such that it is judged when the number of color blocks occurring in one line is not less than 100, that the line is a color line.

Furthermore, in the stage in which the number of color lines detected is not less than the number of color lines for judging a color document THL (for example, THL=100), it is judged that the document is a color document.

Figure 6:
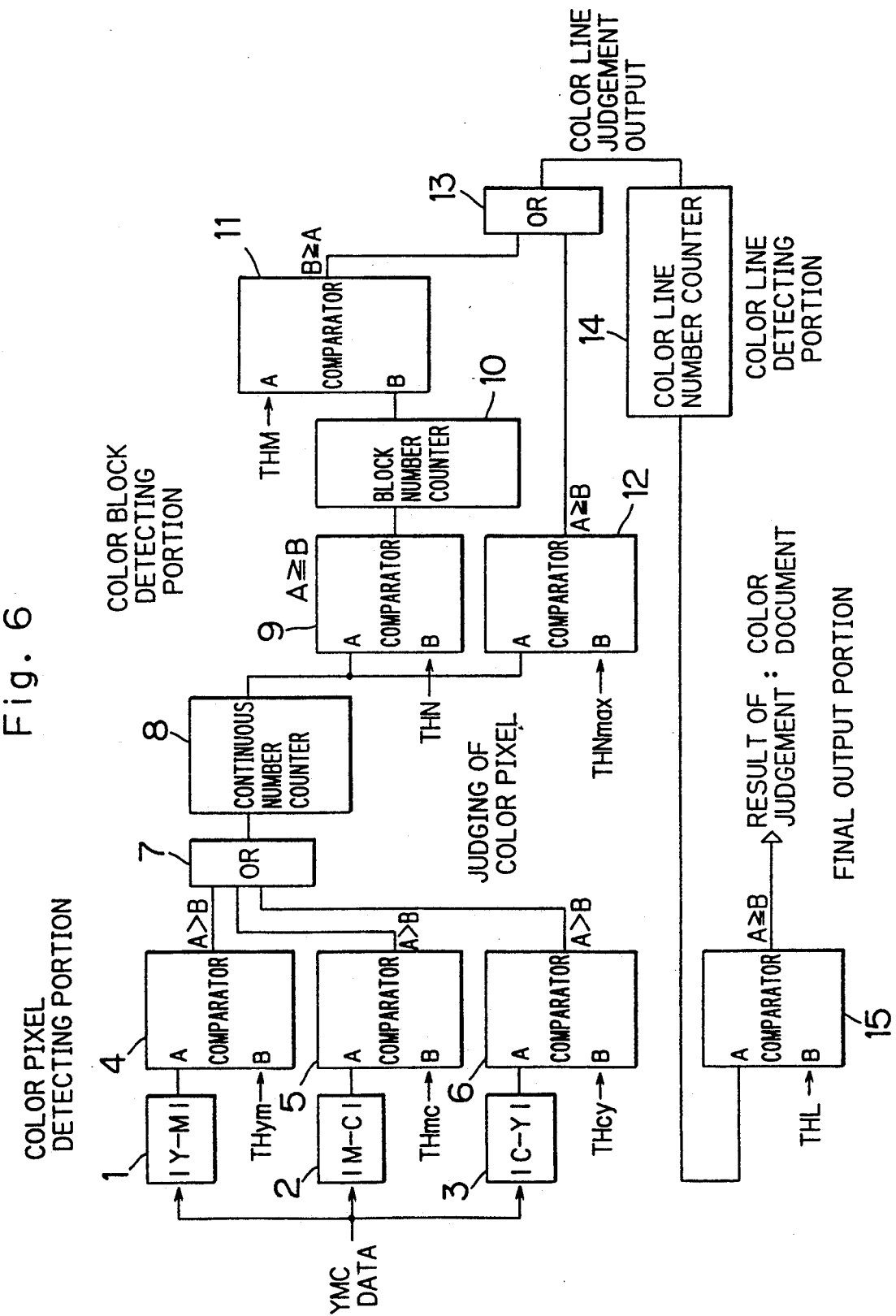
FIG. 6 is a block diagram showing the entire construction of hardware according to one embodiment of the present invention.

FIG. 6 is a block diagram showing the entire construction of hardware according to one embodiment of the present invention. This construction includes a color pixel detecting portion, a color block detecting portion, a color line detecting portion, and a final output portion.

Three YMC data which are document data are applied for each pixel to the color pixel detecting portion. In the color pixel detecting portion, three combinations YM, MC and CY for two colors of the three YMC data are considered and the differences in magnitude between the data are calculated as previous processing for detecting a color pixel.

More specifically, the absolute values of the differences $|Y-M|=\Delta YM$, $|M-C|=\Delta MC$, and $|C-Y|=\Delta CY$ are respectively calculated in absolute value-of-difference calculating circuits 1, 2 and 3, and the results of the calculations are respectively applied to comparators 4, 5 and 6 provided in the next stages. In the comparators 4, 6, and 6, the results of the calculations are compared with threshold values THym, THmc and THcy. The threshold values THYm, THmc and THcy in the respective comparators 4, 5 and 6 may be set to independent and suitable values. In the present embodiment, however, the three threshold values are set to an equal value THx=20 to 30.

Accordingly, when all of the absolute values $\Delta YM$, $\Delta MC$ and $\Delta CY$ of the respective differences are not more than the threshold value THx, the absolute values of the three differences are considered to be the same value. Consequently, no pulse signal is outputted from an OR gate 7, so that it is judged that the pixel is a black-and-white pixel.

On the other hand, when any one of the absolute values of the differences is more than the threshold value THx, a pulse is outputted from any one of the comparators 4, 5 and 6. Consequently, a pulse signal is outputted from the OR gate 7, so that it is judged that the pixel is a color pixel.

The pulse outputted from the OR gate 7 is applied to a continuous number counter 8. In the continuous number counter 8, the number of pulses continuously outputted from the OR gate 7, that is, the number of continuous color pixels is counted.

The counted value of the continuous number counter 8 is applied to two comparators 9 and 12 connected in parallel. In the comparator 9, the counted value of the counter 8 and the number for forming a color block THN=4 are compared with each other. As a result, when the counted value of the counter 8 is not less than four, a pulse is outputted from the comparator 9, to be applied to a block number counter 10.

The block number counter 10 is a counter reset by the reversed Hsync signal for counting the number of color blocks in one line. The counted value of the counter 10 is applied to a comparator 11. In the comparator 11, the counted value is compared with the number of color blocks for forming a color line THM=100. As a result, when there are not less than 100 color blocks in one line, a pulse is outputted from the comparator 11.

On the other hand, the counted value of the continuous number counter 8 applied to the comparator 12 is compared with the number of pixels for forming a color line THNmax=80.

It is when the number of continuous color pixels counted in the continuous number counter 8 is not less than 80 that a pulse is outputted from the comparator 12. When not less than 80 color pixels are thus continuously detected, it is considered that significantly large chromatic color data exists. In the present embodiment, therefore, a line having such a long color block is considered as a color line.

The logical OR between the outputs of the comparators 11 and 12 are carried out in an OR gate 13. Accordingly, when a pulse is outputted from either one of the comparators 11 and 12, it is judged that the line is a color line. An output of the OR gate 13 which is a color line detection signal is counted by a color line number counter 14. When the output of the OR gate 13 is raised from a low level to a high level, the color line number counter 14 counts its rising level and increments the counted value by one. In addition, the counter 14 is reset by the reversed Vsync signal.

Furthermore, the counted value of the color line number counter 14 is compared with the number of color lines for judging a color document THL=100 in a comparator 15. As a result, when the number of color lines is not less than 100, a color document detection signal is outputted.

Figure 7:
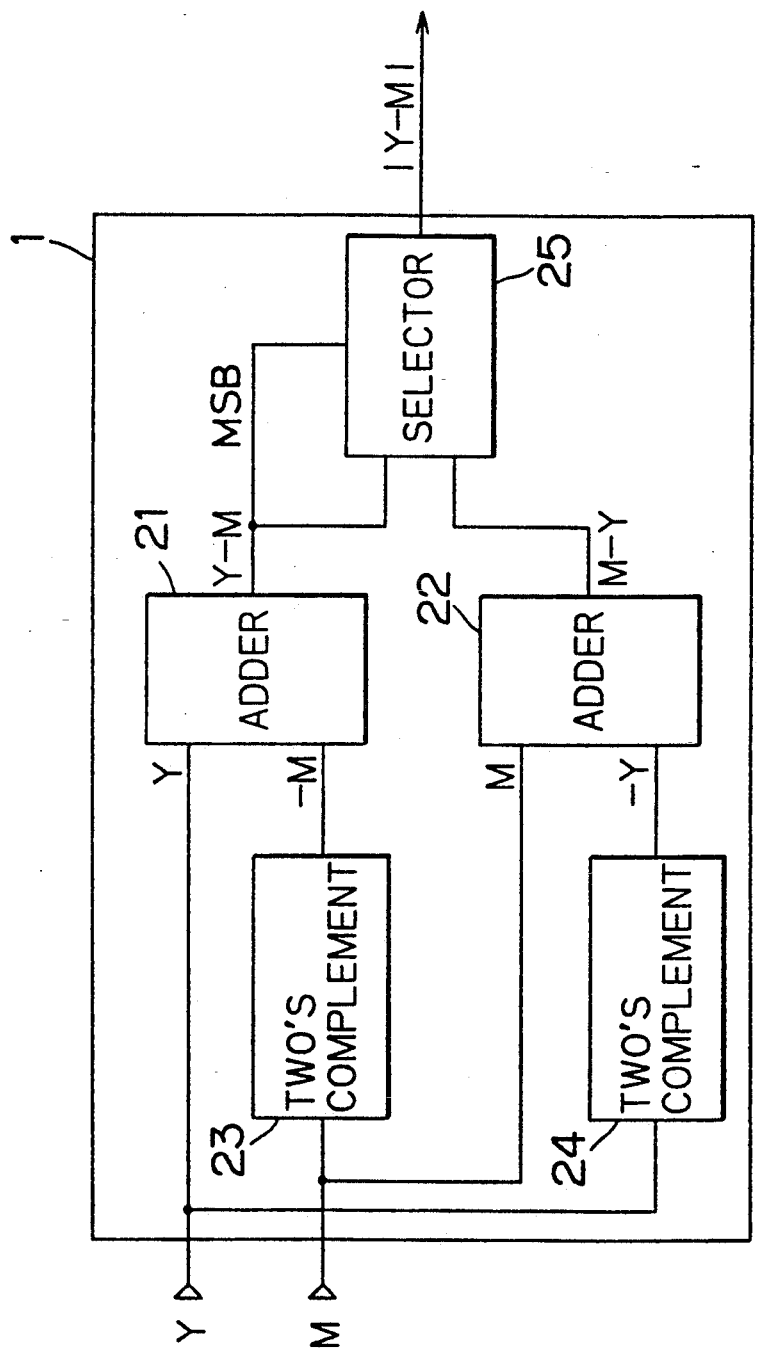
FIG. 7 is a block diagram showing an example of the detailed construction of an absolute value-of-difference calculating circuit.

FIG. 7 is a block diagram showing an example of the detailed construction of the absolute value-of-difference calculating circuit 1 explained in FIG. 6. The absolute value-of-difference calculating circuit 1 comprises two adders 21 and 22, two two's complement circuits 23 and 24, and one selector 25. Y data is directly applied to the adder 21, and the two's complement of the M data is taken in the two's complement circuit 23 so that the M data is reversed to be "−M" and is applied to the adder 21. Accordingly, an output of the adder 21 becomes "Y−M".

Furthermore, the M data is directly applied to the adder 22, and the two's complement of the Y data is taken in the two's complement circuit 24 so that the Y data is reversed to be "−Y" and is applied to the adder 22. Accordingly, an output of the adder 22 becomes "M−Y". The respective outputs of the adders 21 and 22 are selected in the selector 25, and data taking a positive value is adopted. More specifically, the judgment whether the value is positive or negative is made by examining the most significant bit (MSB) of the result of the operation "Y−M", so that "Y−M" is selected when MSB=0 (positive), The absolute value-of-difference calculating circuits 2 and 3 can be similarly constructed.

Figure 8:
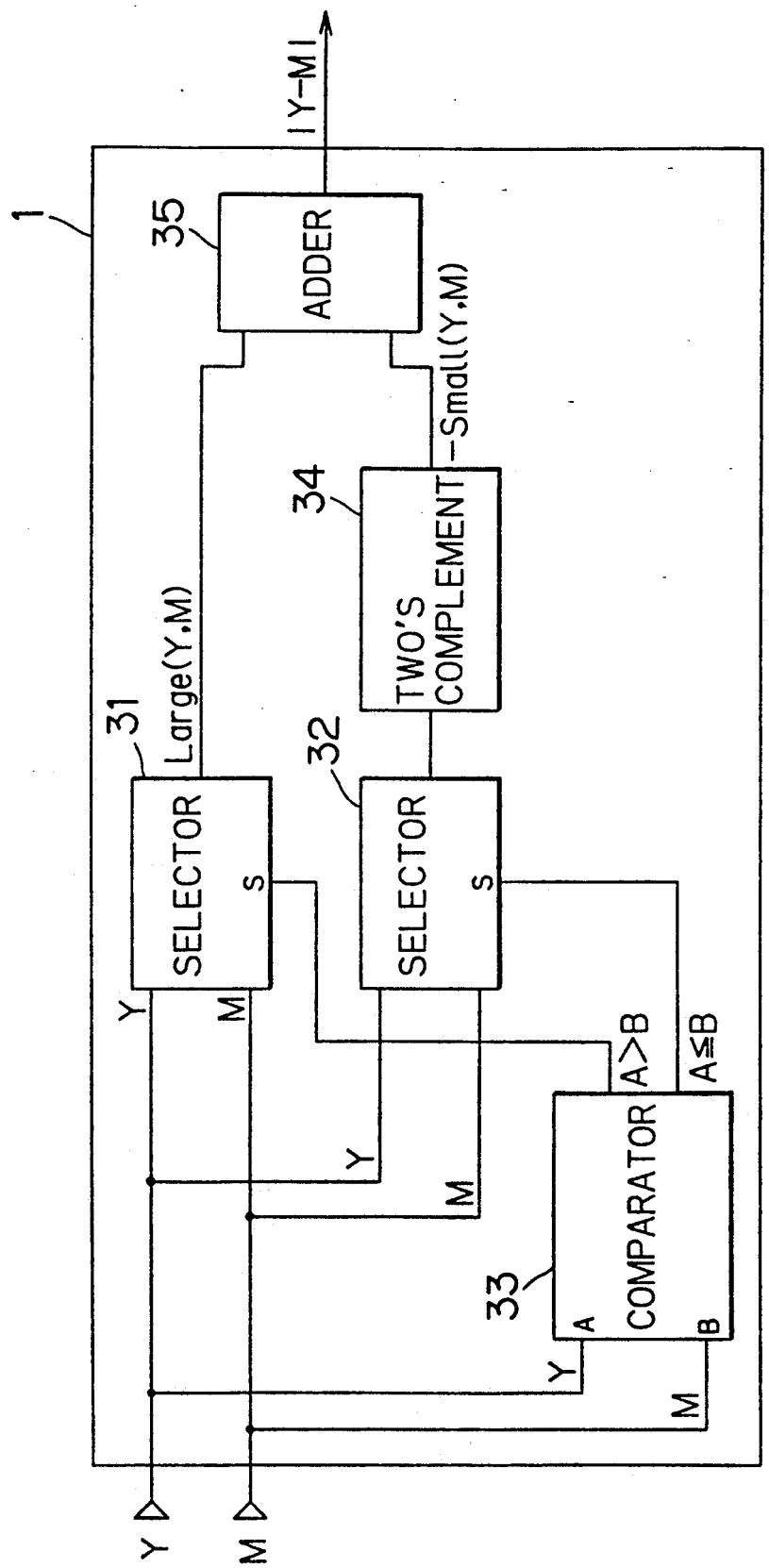
FIG. 8 is a block diagram showing another example of the detailed construction of the absolute value-of-difference calculating circuit.

FIG. 8 is a block diagram showing another example of the detailed construction of the absolute value-of-difference calculating circuit 1. In the construction shown in FIG. 8, the absolute value-of-difference calculating circuit 1 comprises two selectors 31 and 32, a comparator 33 for applying a selection signal to the selectors 31 and 32, one two's complement circuit 34, and one adder 35. In general, the two's complement circuit has a relatively complicated structure. Accordingly, the construction shown in FIG. 8 using only one two's complement circuit can be made more simpler as a whole, as compared with the construction shown in FIG. 7 using two two's complement circuits.

The construction of the absolute value-of-difference calculating circuit 1 shown in FIG. 8 and the operation thereof will be described in detail. Y data and M data are respectively applied to the selectors 31 and 32. In addition, the Y data is applied to an A input of the comparator 33, and the M data is applied to a B input of the comparator 33. In the comparator 33, both the data are compared with each other. An output indicating A>B is used as a selection signal of the selector 31, while an output indicating A≦B is used as a selection signal of the selector 32.

The selector 31 is a circuit for selecting the larger of the Y data and the M data inputted. In addition, the selector 32 is a circuit for selecting the smaller of the Y data and the M data inputted. The smaller of the Y data and the M data which is selected by the selector 32 is reversed in sign in the two's complement circuit 34. As a result, in the adder 35, the larger of the Y data and the M data and data obtained by reversing in sign the smaller one of the Y data and the M data are added to each other. That is, an output of the adder 35 becomes $|Y-M|$.

The other absolute value-of-difference calculating circuits 2 and 3 are similarly constructed.

Figure 9:
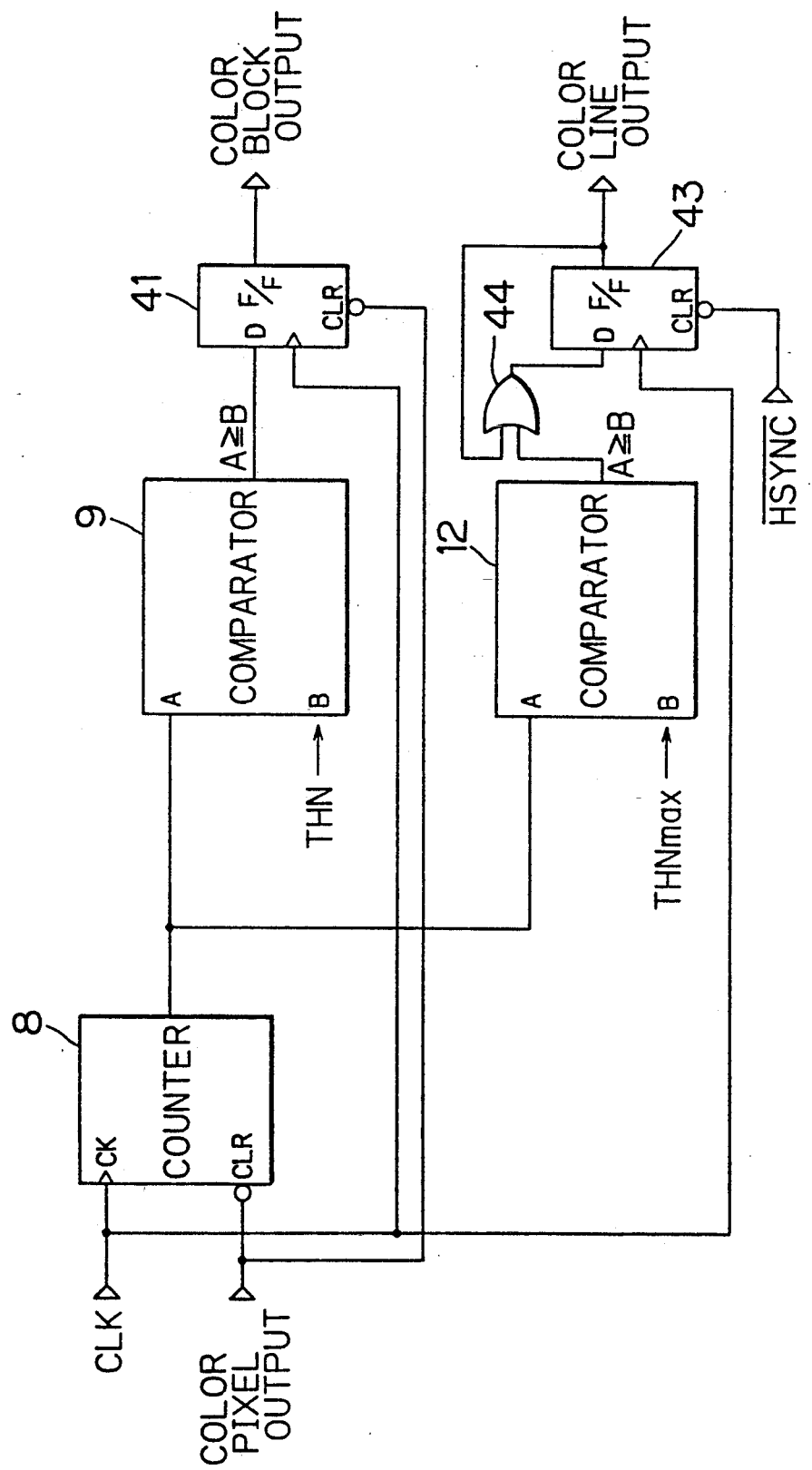
FIG. 9 is a block diagram showing an example of the detailed construction of a color block detecting portion according to one embodiment of the present invention.

FIG. 9 is a block diagram showing an example of the detailed construction of the color block detecting portion. A continuous number counter 8 counts a clock when an output of the OR gate 7 (see FIG. 6) is at a high level, that is, a color pixel detection signal is outputted. Accordingly, the continuous number of color pixels is counted by the counter 8. The counted value of the counter 8 is compared with the number for forming a color block THN and the number of pixels for forming a color line THNmax, respectively, in two comparators 9 and 12 connected in parallel.

As m result of the comparison in the comparator 9, when the continuous number of color pixels is not less than the number for forming a color block THN=4, a pulse is outputted from the comparator 9. This pulse sets a flip-flop 41 at clock rise timing. to bring an output of the flip-flop 41 into a high level. The flip-flop 41 is reset when no color pixel detection signal is outputted.

On the other hand, when the counted value of the counter 8 exceeds the number of pixels for forming a color line THNmax=10, a pulse is outputted from the comparator 12. This pulse sets a flip-flop 43 at clock rise timing. An output of the flip-flop 43 is fed back into a D input of the flip-flop 43 through an OR gate 44. Accordingly, the flip-flop 43 set once is self-held in a period during which the reversed Hsync signal is at a high level.

Figure 10:
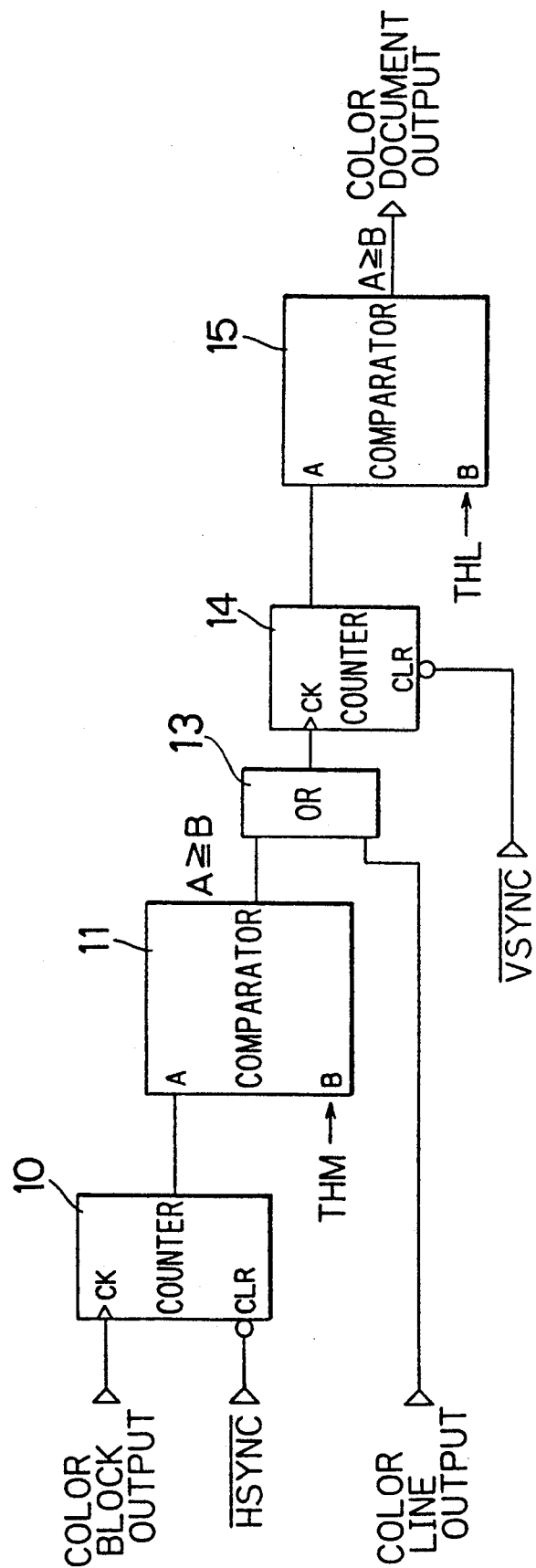
FIG. 10 is a block diagram showing an example of the construction of a color line detecting portion and a final output portion according to one embodiment of the present invention.

FIG. 10 is a block diagram showing an example of the detailed construction of the color line detecting portion and the final output portion. The color line detecting portion comprises a block number counter 10 for counting the number of color blocks in a period during, which the reversed Hsync signal is at a high level. The counted value of the counter 10 is compared with the number of color blocks for forming a color line THM in a comparator 11. When the counted value becomes larger than THM=100, for example, a high output of the comparator 11 is applied to an OR gate 13. A color line output is also applied to the OR gate 13. This color line output is an output of the self-holding type flip-flop 43, as explained in FIG. 9. Accordingly, when the color line output enters a high level once, it remains at a high level until the transition to the next line processing occurs.

An output of the OR gate 13 is applied to a color line number counter 14. In the counter 14, the output is counted in the counter 14 in a period during which the reversed Vsyno signal is at a high level. The counted value of the counter 14 is compared with the number of color lines for judging a color document THL in a comparator 15. The number of color lines for judging a color document THL is set to, for example, 100. When the counted value of the counter 14 exceeds 100, that is, when not less than 100 color lines are detected, a color document detection signal is Outputted.

In the above described embodiment, the counted value of the continuous number counter 8 is compared with the predetermined reference numbers, respectively, in the two comparators 9 and 12 connected in parallel, as explained with reference to, for example, FIGS. 6 and 9.

However, this construction may be made simpler. For example, only the comparator 9 or the comparator 12 may be provided. More specifically, when a color line is detected, either one of the following constructions may be used:

(1) the construction in which it is judged by only detecting not less than a predetermined number of color blocks in one line that the line is a color line, and (2) the construction in which it is judged only when a long color block constituted by not less than a relatively large predetermined number of continuous color pixels is detected in one line that the line is a color line.

Furthermore, although in the above described embodiment, the color block is detected, the color line is detected, and it is judged that the document is a color document when not less than a predetermined number of color lines are detected, such a construction may be employed that a color document detection signal is outputted when not less than a predetermined number of color blocks, for example, not less than 1000 color blocks are detected in a period during which the reversed Vsync signal is at a high level instead of judging for each line whether or not the document is a color document. In the construction, a color line number counter can be omitted, thereby to make it possible to make the circuit structure simpler.

Additionally, although in the above described embodiment, it is judged on the basis of the Y data. the M data and the C data included in the input data whether or not the pixel is a color pixel, it may be judged on the basis of so-called three primary color data, that is, red (R) data, green (G) data and blue (B) data whether a pixel is a color pixel or a black-and-white pixel.

When attempts are made to make copies of a document using a digital color copying machine by incorporating the device for judging the type of color of a document according to the present invention into the digital color copying machine, it is automatically judged in real time whether a document is a color document or a black-and-white document. Accordingly, it is possible to make copies on the basis of the results of the judgment using monochromatic Bk toner particles when the document is a black and white document, while using toner particles in three colors, that is, Y toner particles, M toner particles and C toner particles or toner particles in four colors, that is, Y toner particles, M toner particles, C toner particles and Bk toner particles when the document is a color document.

As a result, there can be provided a copying machine in which a black-and-white document is not copied using toner particles in three colors or in four colors. so that the consumption of the toner particles may be small.

Additionally, a black-and-white document is not copied using a combination of color toner particles. Accordingly, some effects are obtained. For example, the blur of the outline of an image caused by subtle shift in color is eliminated, and character data and the like can be clearly reproduced.

Although in the above described embodiment, the specific numbers such as the number for forming a color block THN, the number of pixels for forming a color line THNmax, the number of color blocks for forming a color line THM, and the number of color lines for judging a color document THL are shown, the specific numbers are not limited, and the respective reference numbers may be varied.

Particularly when the number for forming a color block THN is set to, for example, "1", a color pixel is equal to a color block. Accordingly, the judgment of a judgment of a color document.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for judging the type of color of a document for judging whether a document is a color document containing chromatic color information or a black-and-white document containing only achromatic color information on the basis of document data read, said device comprising:
   color pixel detecting means, to which the document data read are sequentially applied for each pixel, for judging whether or not the pixel is a color pixel having a chromatic color on the basis of pixel data applied, and for outputting a detection signal upon judging that the pixel is a color pixel;
   a color block detecting means for detecting the presence of a color block in the event that the color pixel detecting means continuously outputs detection signals whose number is not less than a predetermined number for forming a color block;
   color line detecting means for judging, in the event that the color block detecting means detects in one line the presence of color blocks whose number is not less than a predetermined number of color blocks for forming a color line, that the line is a color line, and for outputting a detection signal; and
   color document detecting means for outputting a color document detection signal in the event that the color line detecting means outputs detection signals whose number is not less than a predetermined number of color lines for judging a color document.

2. The device for judging the type of color of a document according to claim 1, wherein
   the pixel data applied to the color pixel detecting means includes three types of color data, that is, yellow data, magenta data and cyan data, and
   the color pixel detecting means comprises
   difference calculating means for finding the differences in magnitude between the color data,
   threshold value setting means in which a desired threshold value is set, and
   comparing means for outputting a color pixel detection signal when any one of the differences calculated by the difference calculating means is larger than the threshold value set in the threshold value setting means.

3. The device for judging the type of color of a document according to claim 2, wherein the difference calculating means comprises
   means for calculating the absolute value of the difference in magnitude between the yellow data and the magenta data,
   means for calculating the absolute value in magnitude between the magenta data and the cyan data, and
   means for calculating the absolute value of the difference in magnitude between the cyan data and the yellow data.

4. The device for judging the type of color of a document according to claim 2, wherein
   three threshold values to be respectively compared with the differences in magnitude between the color data are set in the threshold value setting means.

5. The device for judging the type of color of a document according to claim 2, which further comprises
   longitudinal line reading means for sequentially reading the document from its one end side toward the opposed end side, and
   color data processing means for processing for each pixel a read output of the longitudinal line reading means to be data including yellow data, magenta data and cyan data.

6. The device for judging the type of color of a document according to claim 5, wherein
   the line reading means outputs one line signal in synchronization with the start or the termination of reading of one line, so that one line is determined on the basis of the one line signal.

7. A device for judging the type of color of a document for judging whether a document is a color document containing chromatic color information or a black-and-white document containing only achromatic color information on the basis of document data read, said device comprising:
   color pixel detecting means, to which the document data read are sequentially applied for each pixel, for judging whether or not the pixel is a color pixel having a chromatic color on the basis of pixel data applied, and for outputting a detection signal upon judging that the pixel is a color pixel;
   long color block detecting means for detecting the presence of a long color block in the event that the color pixel detecting means continuously outputs detection signals whose number is not less than a predetermined number of pixels for forming a color line;
   color line detecting means for judging in the event that there is a detection output of the long color block detecting means in one line, that the line is a color line, and for outputting a detection signal; and
   color document detecting means for outputting a color document detection signal in the event that the color line detecting means outputs detection signals whose number is not less than a predetermined number of color lines for judging a color document.

8. The device for judging the type of color of a document according to claim 7, wherein
   the pixel data applied to the color pixel detecting means comprises three types of color data, that is, yellow data, magenta data and cyan data, and
   the color pixel detecting means comprises
   difference calculating means for finding the differences in magnitude between the color data,
   threshold value setting means in which a desired threshold value is set, and
   comparing means for outputting a color pixel detection signal when any one of the differences calculated in the difference calculating means is larger than the threshold value set in the threshold value setting means.

9. The device for judging the type of color of a document according to claim 8, wherein the difference calculating means comprises
   means for calculating the absolute value of the difference in magnitude between the yellow data and the magenta data,
   means for calculating the absolute value of the difference in magnitude between the magenta data and the cyan data, and means for calculating the absolute value of the difference in magnitude between the cyan data and the yellow data.

10. The device for judging the type of color of a document according to claim 8, wherein
three threshold values to be respectively compared with the differences in magnitude between the color data are set in the threshold value setting means.

11. The device for judging the type of color of a document according to claim 8, which further comprises
longitudinal line reading means for sequentially reading the document from its one end side toward the opposed end side, and
color data processing means for processing for each pixel a read output of the longitudinal line reading means to be data including yellow data, magenta data and cyan data.

12. The device for judging the type of color of a document according to claim 11, wherein
the line reading means outputs one line signal in synchronization with the start or the termination of reading of one line, so that one line is determined on the basis of the one line signal.

13. A device for judging the type of color of a document for judging whether a document is a color document containing chromatic color information or a black-and-white document containing only achromatic color information on the basis of document data read, said device comprising:
color pixel detecting means, to which the document data read are sequentially applied for each pixel, for judging whether or not the pixel is a color pixel having a chromatic color on the basis of a pixel data applied, and for outputting a detection signal upon judging that the pixel is a color pixel;
color block detecting means for detecting the presence of a color block in the event that the color pixel detecting means continuously outputs detection signals whose number is not less than a predetermined number for forming a color block;
long color block detecting means for detecting the presence of a long color block in the event that the color pixel detecting means continuously outputs detection signals whose number is not less than a predetermined number of pixels for forming a color line;
color line detecting means for judging in the event that the color block detecting means detects in one line the presence of color blocks whose number is not less than a predetermined number for forming a color line, or that there is a detection output of the long color block detecting means, that the line is a color line, and for outputting a detection signal; and
color document detecting means for outputting a color document detection signal in the event that the color line detecting means outputs detection signals whose number is not less than a predetermined number of color lines for judging a color document.

14. The device for judging the type of color of a document according to claim 13, wherein
the pixel data applied to the color pixel detecting means comprises three types of color data, that is, yellow data, magenta data and cyan data, and
the color pixel detecting means comprises difference calculating means for finding the differences in magnitude between the color data,
threshold value setting means in which a desired threshold value is set, and
comparing means for outputting a color pixel detection signal when any one of the differences calculated in the difference calculating means is larger than the threshold value set in the threshold value setting means.

15. The device for judging the type of color of a document according to claim 14, wherein the difference calculating means comprises
means for calculating the absolute value of the magenta data,
means for calculating the absolute value of the difference in magnitude between the magenta data and the cyan data, and
means for calculating the absolute value of the difference in magnitude between the cyan data and the yellow data.

16. The device for judging the type of color of a document according to claim 14, wherein three threshold values to be respectively compared with the differences in magnitude between the color data are set in the threshold value setting means.

17. The device for judging the type of color of a document according to claim 14, which further comprises
longitudinal line reading means for sequentially reading the document from its one end side toward the opposed end side, and
color data processing means for processing for each pixel a read output of the longitudinal line reading means to be data including yellow data, magenta data and cyan data.

18. The device for judging the type of color of a document according to claim 17, wherein
the line reading means outputs one line signal in synchronization with the start or the termination of reading of one line, so that one line is determined on the basis of the one line signal.

19. A device for judging the type of color of a document for judging whether a document is a color document containing chromatic color information or a black-and-white document containing only achromatic color information on the basis of document data read, said device comprising:
color pixel detecting means, to which the document data read are sequentially applied for each pixel, for judging whether or not the pixel is a color pixel having a chromatic color on the basis of pixel data applied, and for outputting a detection signal upon judging that the pixel is a color pixel;
color block detecting means for detecting the presence of a color block in the event that the color pixel detecting means continuously outputs detection signals whose number is not less than a predetermined number for forming a color block; and
color document detecting means for outputting a color document detection signal in the event that the color block detecting means detects the presence of color blocks whose number is not less than a predetermined number of color blocks for judging a color document.

20. The device for judging the type of color of a document according to claim 19, wherein the pixel data applied to the color pixel detecting means includes three types of color data, that is, yellow data, magenta data and cyan data, and the color pixel detecting means comprises difference calculating means for finding the differences in magnitude between the color data, threshold value setting means in which a desired threshold value is set, and comparing means for outputting a color pixel detection signal when any one of the differences calculated by the difference calculating means is larger than the threshold value set in the threshold value setting means.

21. The device for judging the type of color of a document according to claim 20, wherein the difference calculating means comprises means for calculating the absolute value of the difference in magnitude between the yellow data and the magenta data, means for calculating the absolute value of the difference in magnitude between the magenta data and the cyan data, and means for calculating the absolute value of the difference in magnitude between the cyan data and the yellow data.

22. The device for judging the type of color of a document according to claim 20, wherein three threshold values to be respectively compared with the differences in magnitude between the color data are set in the threshold value setting means.

* * * * *